(12) United States Patent
Abotabl et al.

(10) Patent No.: US 12,256,389 B2
(45) Date of Patent: Mar. 18, 2025

(54) FEEDBACK TRANSMISSIONS ON UPLINK RESOURCES OF BANDWIDTH PARTS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 343 days.

(21) Appl. No.: 17/445,361

(22) Filed: Aug. 18, 2021

(65) Prior Publication Data
US 2023/0053490 A1 Feb. 23, 2023

(51) Int. Cl.
*H04W 72/21* (2023.01)
*H04L 1/1812* (2023.01)
*H04L 5/14* (2006.01)

(52) U.S. Cl.
CPC ........... *H04W 72/21* (2023.01); *H04L 1/1812* (2013.01); *H04L 5/14* (2013.01)

(58) Field of Classification Search
CPC ......... H04W 72/21; H04L 1/1812; H04L 5/14
See application file for complete search history.

(56) References Cited

U.S. PATENT DOCUMENTS

| | | | | |
|---|---|---|---|---|
| 2014/0133411 A1* | 5/2014 | Park | ............ | H04L 5/0058 370/329 |
| 2017/0201986 A1* | 7/2017 | Chae | ............ | H04B 7/0456 |
| 2019/0103943 A1* | 4/2019 | Wang | ............ | H04L 1/1854 |
| 2020/0145169 A1* | 5/2020 | Zhou | ............ | H04W 76/27 |
| 2020/0358587 A1* | 11/2020 | Wang | ............ | H04W 72/23 |
| 2021/0136697 A1* | 5/2021 | Fu | ............ | H04W 80/08 |
| 2022/0078781 A1* | 3/2022 | Zhou | ............ | H04W 16/14 |
| 2023/0038049 A1* | 2/2023 | Li | ............ | H04L 1/1854 |
| 2024/0031044 A1* | 1/2024 | Kim | ............ | H04L 5/0048 |

FOREIGN PATENT DOCUMENTS

WO 2019157696 A1 8/2019

OTHER PUBLICATIONS

CEWiT India, "View on study of in-band full duplex (IBFD) operation in Rel. 18" RWS-210488, Jul. 2, 2021, pp. 2-17 (Year: 2021).*
International Search Report and Written Opinion—PCT/US2022/074064—ISA/EPO—Nov. 8, 2022.

* cited by examiner

*Primary Examiner* — Christopher M Crutchfield
*Assistant Examiner* — Tito Q Pham
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a downlink transmission in a downlink resource of a first bandwidth part (BWP) associated with a first time division duplexing (TDD) pattern. The UE may transmit, to the base station based at least in part on the downlink transmission, hybrid automatic repeat request acknowledgement (HARQ-ACK) feedback on a physical uplink control channel (PUCCH) resource of the first BWP or of a second BWP associated with a second TDD pattern. Numerous other aspects are described.

30 Claims, 10 Drawing Sheets

FEEDBACK TRANSMISSIONS ON UPLINK RESOURCES OF BANDWIDTH PARTS

FIELD OF THE DISCLOSURE

Aspects of the present disclosure generally relate to wireless communication and to techniques and apparatuses for feedback transmissions on uplink resources of bandwidth parts (BWPs).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a user equipment (UE) includes a memory and one or more processors, coupled to the memory, configured to: receive, from a base station, a downlink transmission in a downlink resource of a first bandwidth part (BWP) associated with a first time division duplexing (TDD) pattern; and transmit, to the base station based at least in part on the downlink transmission, hybrid automatic repeat request acknowledgement (HARQ-ACK) feedback on a physical uplink control channel (PUCCH) resource of the first BWP or of a second BWP associated with a second TDD pattern.

In some implementations, an apparatus for wireless communication at a base station includes a memory and one or more processors, coupled to the memory, configured to: transmit, to a UE, a downlink transmission in a downlink resource of a first BWP associated with a first TDD pattern; and receive, from the UE based at least in part on the downlink transmission, HARQ-ACK feedback on a PUCCH resource of the first BWP or of a second BWP associated with a second TDD pattern.

In some implementations, a method of wireless communication performed by a UE includes receiving, from a base station, a downlink transmission in a downlink resource of a first BWP associated with a first TDD pattern; and transmitting, to the base station based at least in part on the downlink transmission, HARQ-ACK feedback on a PUCCH resource of the first BWP or of a second BWP associated with a second TDD pattern.

In some implementations, a method of wireless communication performed by a base station includes transmitting, to a UE, a downlink transmission in a downlink resource of a first BWP associated with a first TDD pattern; and receiving, from the UE based at least in part on the downlink transmission, HARQ-ACK feedback on a PUCCH resource of the first BWP or of a second BWP associated with a second TDD pattern.

In some implementations, a non-transitory computer-readable medium storing a set of instructions for wireless communication includes one or more instructions that, when executed by one or more processors of a UE, cause the UE to: receive, from a base station, a downlink transmission in a downlink resource of a first BWP associated with a first TDD pattern; and transmit, to the base station based at least in part on the downlink transmission, HARQ-ACK feedback on a PUCCH resource of the first BWP or of a second BWP associated with a second TDD pattern.

In some implementations, a non-transitory computer-readable medium storing a set of instructions for wireless communication includes one or more instructions that, when executed by one or more processors of a base station, cause the base station to: transmit, to a UE, a downlink transmission in a downlink resource of a first BWP associated with a first TDD pattern; and receive, from the UE based at least in part on the downlink transmission, HARQ-ACK feedback on a PUCCH resource of the first BWP or of a second BWP associated with a second TDD pattern.

In some implementations, an apparatus for wireless communication includes means for receiving, from a base station, a downlink transmission in a downlink resource of a first BWP associated with a first TDD pattern; and means for transmitting, to the base station based at least in part on the downlink transmission, HARQ-ACK feedback on a PUCCH resource of the first BWP or of a second BWP associated with a second TDD pattern.

In some implementations, an apparatus for wireless communication includes means for transmitting, to a UE, a downlink transmission in a downlink resource of a first BWP associated with a first TDD pattern; and means for receiving, from the UE based at least in part on the downlink transmission, HARQ-ACK feedback on a PUCCH resource of the first BWP or of a second BWP associated with a second TDD pattern.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
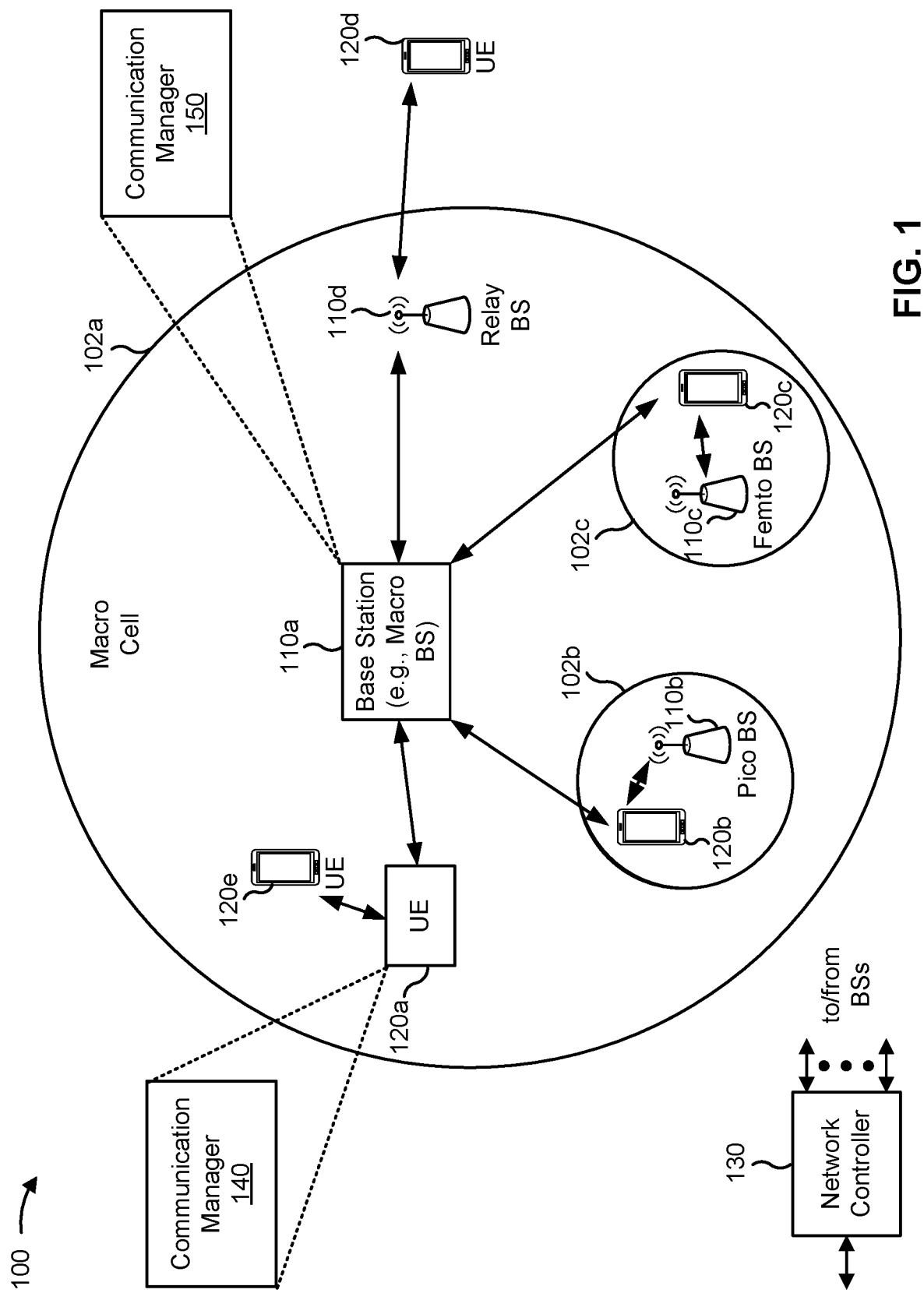
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., UE 120) may include a communication manager 140. As described in more detail elsewhere herein, the communication manager 140 may receive, from a base station, a downlink transmission in a downlink resource of a first BWP associated with a first TDD pattern; and transmit, to the base station based at least in part on the downlink transmission, HARQ-ACK feedback on a PUCCH resource of the first BWP or of a second BWP associated with a second TDD pattern. Additionally, or alternatively, the communication manager 140 may perform one or more other operations described herein.

In some aspects, a base station (e.g., base station 110) may include a communication manager 150. As described in more detail elsewhere herein, the communication manager 150 may transmit, to a UE, a downlink transmission in a downlink resource of a first BWP associated with a first TDD pattern; and receive, from the UE based at least in part on the downlink transmission, HARQ-ACK feedback on a PUCCH resource of the first BWP or of a second BWP associated with a second TDD pattern. Additionally, or alternatively, the communication manager 150 may perform one or more other operations described herein.

As indicated above, FIG. 1 is provided as an example. Other examples may differ from what is described with regard to FIG. 1.

Figure 2:
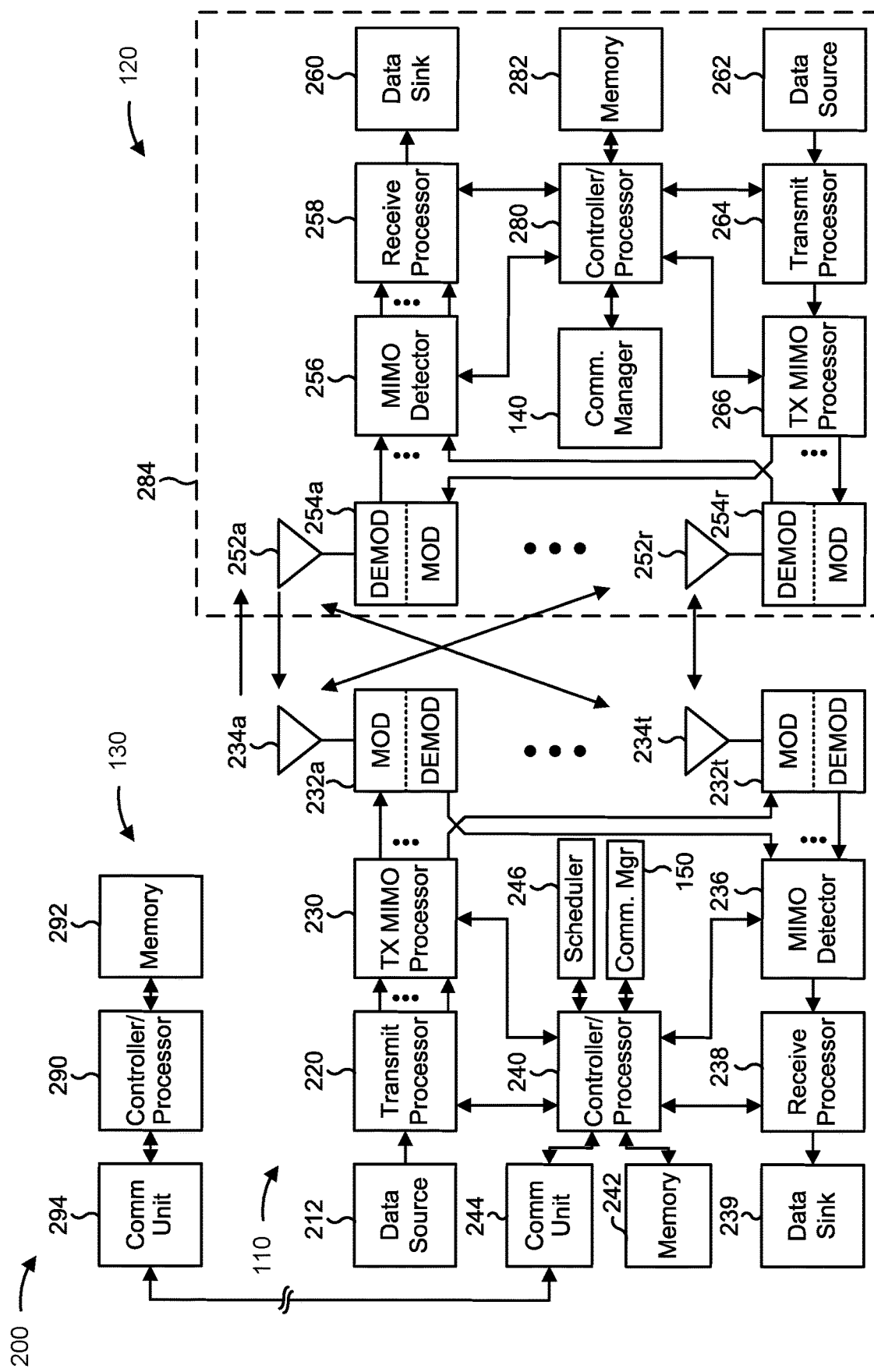
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the base station 110, the controller/processor 280 of the UE 120, and/or any other component(s) of FIG. 2 may perform one or more techniques associated with feedback transmissions on uplink resources of BWPs, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a UE (e.g., UE 120) includes means for receiving, from a base station, a downlink transmission in a downlink resource of a first BWP associated with a first TDD pattern; and/or means for transmitting, to the base station based at least in part on the downlink transmission, HARQ-ACK feedback on a PUCCH resource of the first BWP or of a second BWP associated with a second TDD pattern. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station (e.g., base station 110) includes means for transmitting, to a UE, a downlink transmission in a downlink resource of a first BWP associated with a first TDD pattern; and/or means for receiving, from the UE based at least in part on the downlink transmission, HARQ-ACK feedback on a PUCCH resource of the first BWP or of a second BWP associated with a second TDD pattern. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Full-duplex communications may provide relatively high spectral efficiency, relatively high data rates, and relatively low latency. The relatively low latency may arise from an availability of a downlink and an uplink at all times, such that a UE may not need to wait until an uplink slot is present to transmit an uplink transmission, such as a HARQ-ACK feedback or a scheduling request.

A BWP-specific TDD pattern may be used to realize a structure of a sub-band full duplex (SBFD) slot or an in-band full-duplex (IBFD) slot. The BWP-specific TDD pattern may assign a slot format for a BWP. The SBFD slot or the IBFD slot may be realized by allowing more than one BWP to be active at a given time.

Figure 3:
FIG. 3 is a diagram illustrating an example of a bandwidth part (BWP)-specific time division duplexing (TDD) pattern, in accordance with the present disclosure.

FIG. 3 is a diagram illustrating an example 300 of a BWP-specific TDD pattern, in accordance with the present disclosure.

A first BWP (BWP1) may be associated with a BWP-specific TDD pattern, such as 'DDDU', where 'D' refers to a downlink resource and 'U' refers to an uplink resource. A second BWP (BWP2) may be associated with a BWP-specific TDD pattern, such as 'DUUU'. The first BWP and the second BWP may be active at a given time, thereby forming an SBFD slot or an IBFD slot. A BWP associated with a BWP-specific TDD pattern may be referred to as a flexible BWP, such that the first BWP and the second BWP may be considered to be flexible BWPs configured with specific TDD patterns.

As indicated above, FIG. 3 is provided as an example. Other examples may differ from what is described with regard to FIG. 3.

One challenge associated with BWP-specific TDD patterns used for forming SBFD/IBFD slots relates to HARQ-ACK configurations. For example, a downlink scheduling may occur in a downlink resource of a single BWP or in downlink resources of both BWPs. A UE may transmit HARQ-ACK feedback based at least in part on the downlink scheduling. However, the UE may not be configured to utilize certain HARQ-ACK resources for transmitting the HARQ-ACK feedback that improve latency. For example, as a default, the UE may not utilize HARQ-ACK resources from different BWPs when transmitting the HARQ-ACK feedback, which may increase the latency since the UE has to wait until a HARQ-ACK resource becomes available on a same BWP associated with the downlink scheduling.

In various aspects of techniques and apparatuses described herein, a UE may receive, from a base station, a downlink transmission in a downlink resource of a first BWP associated with a first TDD pattern. The UE may transmit, to the base station based at least in part on the downlink transmission, HARQ-ACK feedback on a PUCCH resource of the first BWP or of a second BWP associated with a second TDD pattern. A flexible BWP, such as the first BWP or the second BWP, may be a BWP that is configured with a specific TDD pattern. The UE may transmit the HARQ-ACK feedback in one of multiple configured BWPs with TDD patterns. As a result, a latency associated with transmitting the HARQ-ACK feedback may be reduced, since the UE may utilize other configured BWPs for transmitting the HARQ-ACK feedback (e.g., a BWP other than a BWP used for receiving the downlink transmission).

Figure 4:
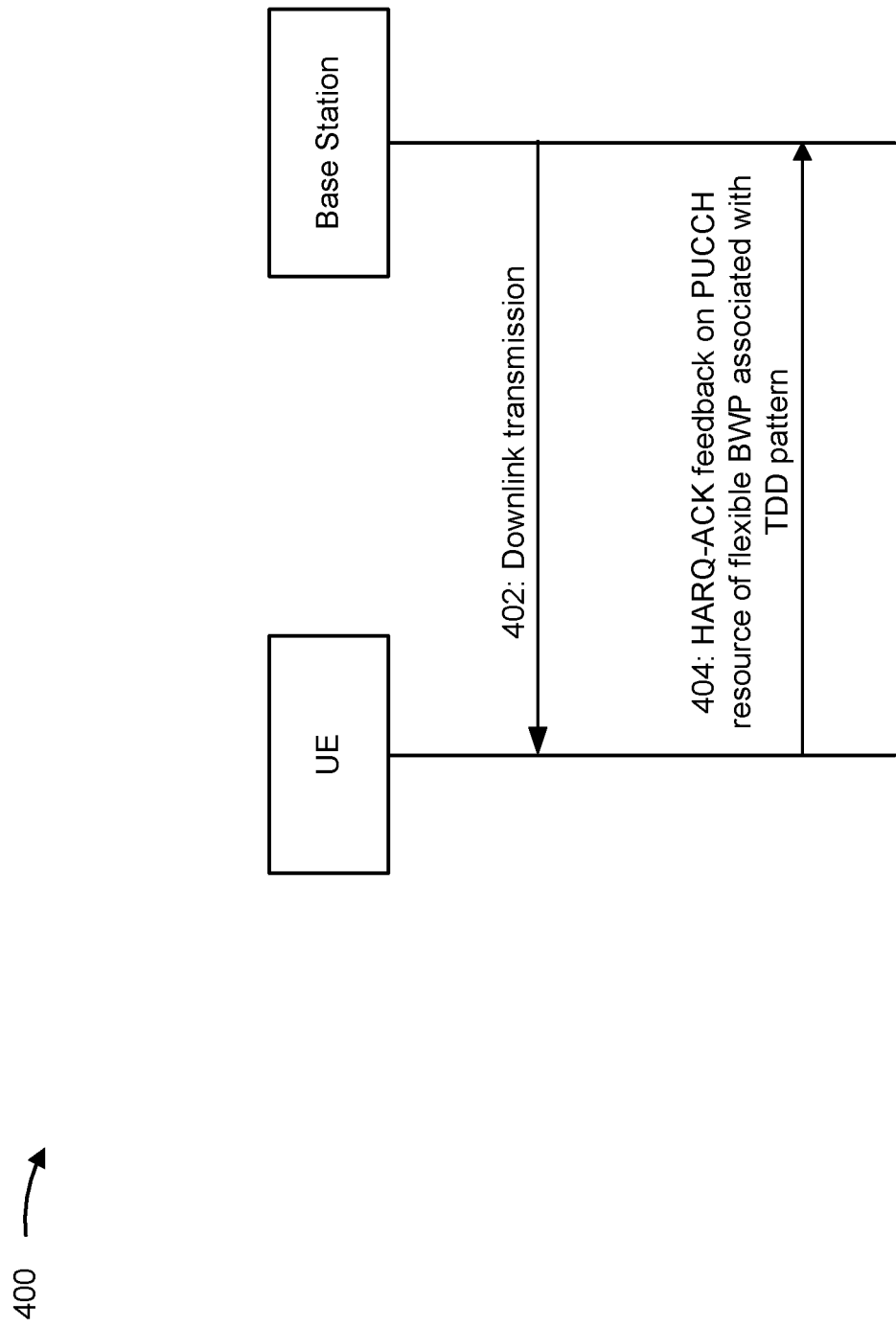
FIGS. 4-6 are diagrams illustrating examples associated with feedback transmissions on uplink resources of BWPs, in accordance with the present disclosure.

FIG. 4 is a diagram illustrating an example 400 associated with feedback transmissions on uplink resources of BWPs, in accordance with the present disclosure. As shown in FIG. 4, example 400 includes communication between a UE (e.g., UE 120) and a base station (e.g., base station 110). In some aspects, the UE and the base station may be included in a wireless network, such as wireless network 100.

As shown by reference number 402, the UE may receive, from the base station, a downlink transmission in a downlink resource of a first BWP associated with a first TDD pattern. The first BWP may be a flexible BWP configured with a specific TDD pattern. The UE may be configured with multiple BWPs, which may include the first BWP and a second BWP. The second BWP may be associated with a second TDD pattern. The second BWP may be a flexible BWP configured with a specific TDD pattern. The second TDD pattern may be different than the first TDD pattern. Alternatively, the second TDD pattern may be the same as the first TDD pattern. The first TDD pattern and the second TDD pattern may be BWP-specific TDD patterns. The downlink transmission in the downlink resource may be a physical downlink shared channel (PDSCH) transmission.

As shown by reference number 404, the UE may transmit, to the base station based at least in part on the downlink transmission, HARQ-ACK feedback on a PUCCH resource of the first BWP associated with the first TDD pattern or of the second BWP associated with the second TDD pattern. In some aspects, the UE may transmit the HARQ-ACK feedback on a PUCCH resource associated with any BWP configured for the UE, where the BWP may be a flexible BWP configured with a specific TDD pattern.

In some aspects, the UE may receive, from the base station, downlink control information (DCI) that indicates a PUCCH resource indicator (PRI) field associated with the PUCCH resource to be used for transmitting the HARQ-ACK feedback. The PRI field may include one or more bits to indicate a BWP (e.g., the first BWP or the second BWP) associated with the PUCCH resource. In some aspects, the PRI field may include two bits to jointly indicate a PUCCH configuration associated with the PUCCH resource and the BWP associated with transmitting the HARQ-ACK feedback.

In some aspects, the PRI field in the DCI may carry the PUCCH configuration associated with the PUCCH resource used for transmitting the HARQ-ACK feedback. The PRI field may be based at least in part on a per-BWP configuration, which may cause a problem for BWPs (e.g., flexible BWPs) operating with BWP-specific TDD patterns. As a result, one or more bits may be added to the PRI field to indicate the BWP of the PUCCH resource. For example, one bit may be added to the PRI field to indicate whether two bits of the PRI field are associated with a PUCCH configuration of the first BWP or a PUCCH configuration of the second BWP. In some aspects, two bits of the PRI field may be jointly coded to indicate the PUCCH configuration and the BWP associated with transmitting the HARQ-ACK feedback.

In some aspects, the PUCCH resource used to transmit the HARQ-ACK feedback may be associated with a PUCCH configuration of a combined BWP that combines the first BWP and the second BWP, based at least in part on a half-duplex slot formed by the first BWP and the second BWP. In some aspects, the PUCCH resource used to transmit the HARQ-ACK feedback may be associated with a PUCCH configuration of either the first BWP or the second BWP that corresponds to an anchor BWP, based at least in part on a half-duplex slot formed by the first BWP and the second BWP.

In some aspects, the UE may select the first BWP or the second BWP for transmitting the HARQ-ACK feedback based at least in part on a self-interference condition. In these aspects, the UE may not receive, from the base station, an indication of the first BWP or the second BWP for transmitting the HARQ-ACK feedback.

In some aspects, multiple BWPs may be associated with BWP-specific TDD patterns, and each BWP may have PUCCH configurations. The base station may reduce signaling by not specifying the BWP associated with the PUCCH configuration used for transmitting the HARQ-ACK feedback (e.g., the base station may not specify the BWP from which the PUCCH configurations will be taken). The UE may not be indicated the BWP from which the PUCCH configurations will be taken. Instead, the UE may select the BWP and/or PUCCH configuration for transmitting the HARQ-ACK feedback according to some criteria, such as priority rules for selecting PUCCH resources across different BWPs. In some aspects, the UE may select the BWP for transmitting the HARQ-ACK feedback based at least in part on the self-interference condition, which may be configured via radio resource control (RRC) signaling. For example, between two BWPs with PUCCH resources (e.g., the first BWP and the second BWP), the UE may select either the first BWP or the second BWP that is furthest away in time and/or frequency from downlink resources, which may reduce a likelihood of self-interference at the UE.

In some aspects, the UE may transmit the HARQ-ACK feedback in accordance with a time offset (K1) in the PUCCH resource that is available in the first BWP or the second BWP. In other words, the UE may determine the PUCCH resource based at least in part on the time offset. The UE may select the first BWP or the second BWP based at least in part on both the first BWP and the second BWP having available PUCCH resources at the time offset. In some aspects, the PUCCH resource may be an earliest available PUCCH resource among the first BWP and the second BWP based at least in part on the first BWP and the second BWP not having an available PUCCH resource at the time offset.

In some aspects, the UE may transmit the HARQ-ACK feedback in the PUCCH resource that is available among the multiple BWPs, such as the first BWP and the second BWP. In some aspects, when more than one BWP has an available PUCCH resource, the UE may select one of the PUCCH resources in accordance with some RRC configured criteria or ordering. In some aspects, when no BWP has an available PUCCH resource, the UE may transmit the HARQ-ACK feedback in an earliest available PUCCH resource among the multiple BWPs.

In some aspects, for the downlink transmission (e.g., the PDSCH transmission) scheduled in the first BWP, the time offset may not necessarily coincide with a PUCCH resource in the same BWP (e.g., the first BWP), but the PUCCH resource may be available in other BWPs (e.g., the second BWP). In this case, the UE may transmit the HARQ-ACK feedback in the PUCCH resource of the second BWP, even though the downlink transmission was received in the first BWP.

As indicated above, FIG. 4 is provided as an example. Other examples may differ from what is described with regard to FIG. 4.

Figure 5:
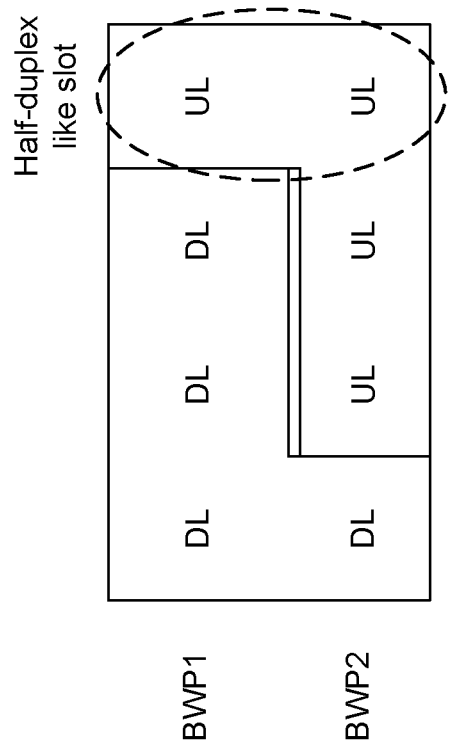

FIG. 5 is a diagram illustrating an example 500 associated with feedback transmissions on uplink resources of BWPs, in accordance with the present disclosure.

In some aspects, a first BWP (BWP1) may be associated with a BWP-specific TDD pattern, such as 'DDDU'. A second BWP (BWP2) may be associated with a BWP-specific TDD pattern, such as 'DUUU'. The first BWP and the second BWP may be active at a given time, thereby forming an SBFD slot or an IBFD slot. A BWP associated with a BWP-specific TDD pattern may be referred to as a flexible BWP, such that the first BWP and the second BWP may be considered to be flexible BWPs configured with specific TDD patterns.

In some aspects, an uplink resource of the first BWP may overlap with an uplink resource of the second BWP, thereby forming a half-duplex like slot. The half-duplex like slot may be considered to be half-duplex since only uplink transmissions may occur during this slot.

In some aspects, for the half-duplex like slot, a UE may follow a PUCCH configuration of a BWP that combines the first BWP and the second BWP. The PUCCH configuration may be associated with a PUCCH resource used to transmit HARQ-ACK feedback to a base station. In some aspects, for the half-duplex like slot, the UE may follow a PUCCH configuration of one of the underlying BWPs, such as an anchor BWP. The PUCCH configuration may be associated with either the first BWP or the second BWP that corresponds to the anchor BWP, where the PUCCH configuration may be associated with the PUCCH resource used to transmit HARQ-ACK feedback to a base station.

As indicated above, FIG. 5 is provided as an example. Other examples may differ from what is described with regard to FIG. 5.

Figure 6:
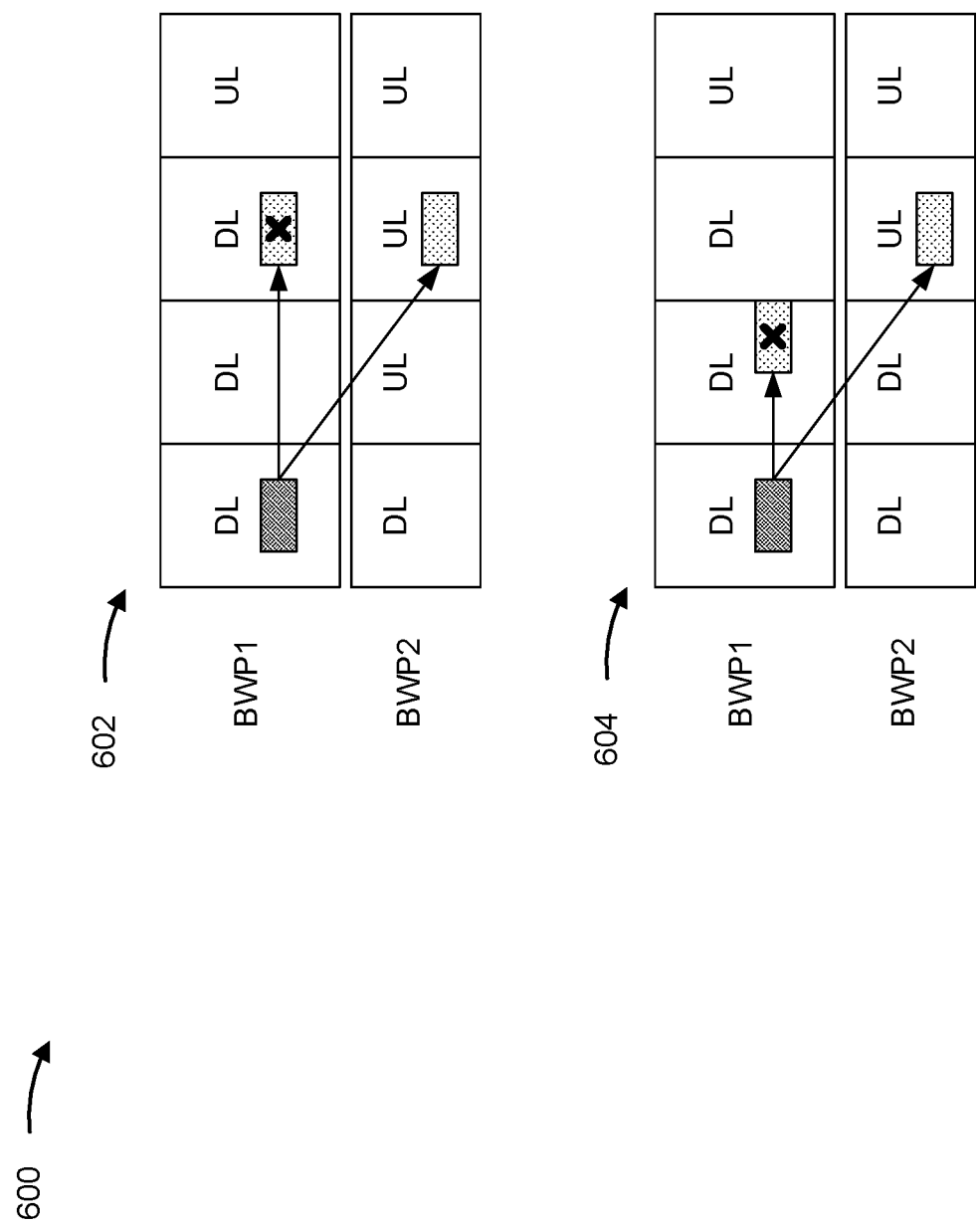

FIG. 6 is a diagram illustrating an example 600 associated with feedback transmissions on uplink resources of BWPs, in accordance with the present disclosure.

As shown by reference number 602, a UE may be configured with a first BWP and a second BWP. The UE may receive a downlink transmission in a first slot (e.g., a downlink slot) associated with the first BWP. In this example, a time offset (K1) may be equal to two, but a corresponding slot in the first BWP may not be associated with a PUCCH resource. A slot in the second BWP in accordance with the time offset of two may include a PUCCH resource, so the UE may transmit HARQ-ACK feedback for the downlink transmission in the PUCCH resource of the second BWP.

As shown by reference number 604, a UE may be configured with a first BWP and a second BWP. The UE may receive a downlink transmission in a first slot (e.g., a downlink slot) associated with the first BWP. In this example, a time offset (K1) may be equal to one, but a corresponding slot in the first BWP may not be associated with a PUCCH resource. Further, a slot in the second BWP in accordance with the time offset equal to one may also not include a PUCCH resource. In this case, the UE may transmit HARQ-ACK feedback for the downlink transmission in an earliest available PUCCH resource, which in this example, may be found in the second BWP.

As indicated above, FIG. 6 is provided as an example. Other examples may differ from what is described with regard to FIG. 6.

Figure 7:
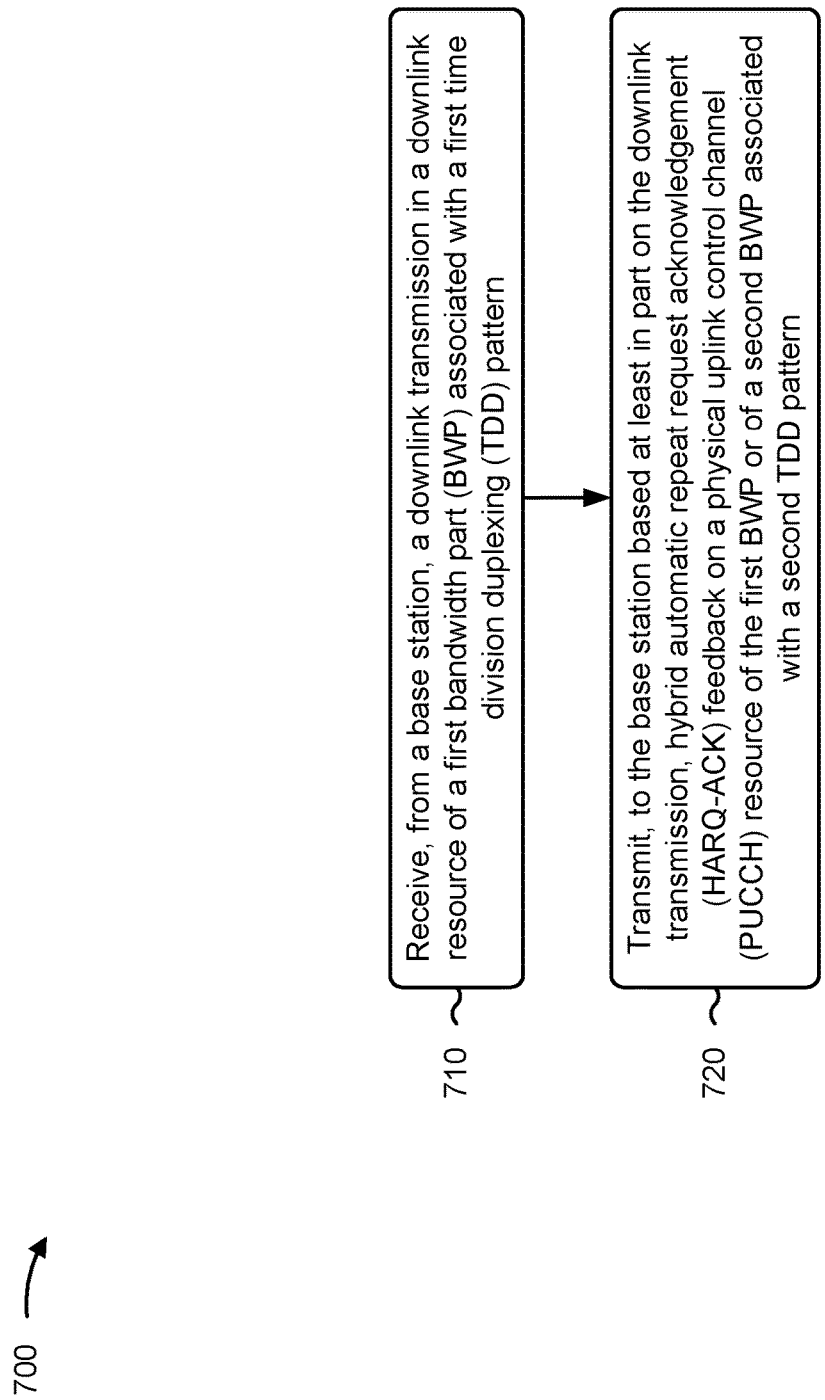
FIGS. 7-8 are diagrams illustrating example processes associated with feedback transmissions on uplink resources of BWPs, in accordance with the present disclosure.

FIG. 7 is a diagram illustrating an example process 700 performed, for example, by a UE, in accordance with the present disclosure. Example process 700 is an example where the UE (e.g., UE 120) performs operations associated with feedback transmissions on uplink resources of BWPs.

As shown in FIG. 7, in some aspects, process 700 may include receiving, from a base station, a downlink transmission in a downlink resource of a first BWP associated with a first TDD pattern (block 710). For example, the UE (e.g., using communication manager 140 and/or reception component 902, depicted in FIG. 9) may receive, from a base station, a downlink transmission in a downlink resource of a first BWP associated with a first TDD pattern, as described above.

As further shown in FIG. 7, in some aspects, process 700 may include transmitting, to the base station based at least in part on the downlink transmission, HARQ-ACK feedback on a PUCCH resource of the first BWP or of a second BWP associated with a second TDD pattern (block 720). For example, the UE (e.g., using communication manager 140 and/or transmission component 904, depicted in FIG. 9) may transmit, to the base station based at least in part on the downlink transmission, HARQ-ACK feedback on a PUCCH resource of the first BWP or of a second BWP associated with a second TDD pattern, as described above.

Process 700 may include additional aspects, such as any single aspect or any combination of aspects described below and/or in connection with one or more other processes described elsewhere herein.

In a first aspect, process 700 includes receiving, from the base station, DCI that indicates a PRI field associated with the PUCCH resource used for transmitting the HARQ-ACK feedback.

In a second aspect, alone or in combination with the first aspect, the PRI field includes one or more bits to indicate a BWP associated with the PUCCH resource, wherein the BWP is the first BWP or the second BWP.

In a third aspect, alone or in combination with one or more of the first and second aspects, the PRI field includes two bits to jointly indicate a PUCCH configuration associated with the PUCCH resource and a BWP associated with transmitting the HARQ-ACK feedback, wherein the BWP is the first BWP or the second BWP.

In a fourth aspect, alone or in combination with one or more of the first through third aspects, the PUCCH resource used for transmitting the HARQ-ACK feedback is associated with a PUCCH configuration of a BWP that combines the first BWP and the second BWP, based at least in part on a half-duplex slot formed by the first BWP and the second BWP.

In a fifth aspect, alone or in combination with one or more of the first through fourth aspects, the PUCCH resource used for transmitting the HARQ-ACK feedback is associated with a PUCCH configuration of either the first BWP or the second BWP that corresponds to an anchor BWP, based at least in part on a half-duplex slot formed by the first BWP and the second BWP.

In a sixth aspect, alone or in combination with one or more of the first through fifth aspects, process 700 includes selecting the first BWP or the second BWP for transmitting the HARQ-ACK feedback based at least in part on a self-interference condition, wherein an indication of the first BWP or the second BWP for transmitting the HARQ-ACK feedback is not received from the base station.

In a seventh aspect, alone or in combination with one or more of the first through sixth aspects, process 700 includes transmitting the HARQ-ACK feedback in accordance with a time offset in the PUCCH resource that is available in the first BWP or the second BWP.

In an eighth aspect, alone or in combination with one or more of the first through seventh aspects, process 700 includes selecting the first BWP or the second BWP based at least in part on both the first BWP and the second BWP having available PUCCH resources at the time offset.

In a ninth aspect, alone or in combination with one or more of the first through eighth aspects, the PUCCH resource is an earliest available PUCCH resource among the first BWP and the second BWP based at least in part on the first BWP and the second BWP not having an available PUCCH resource at the time offset.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
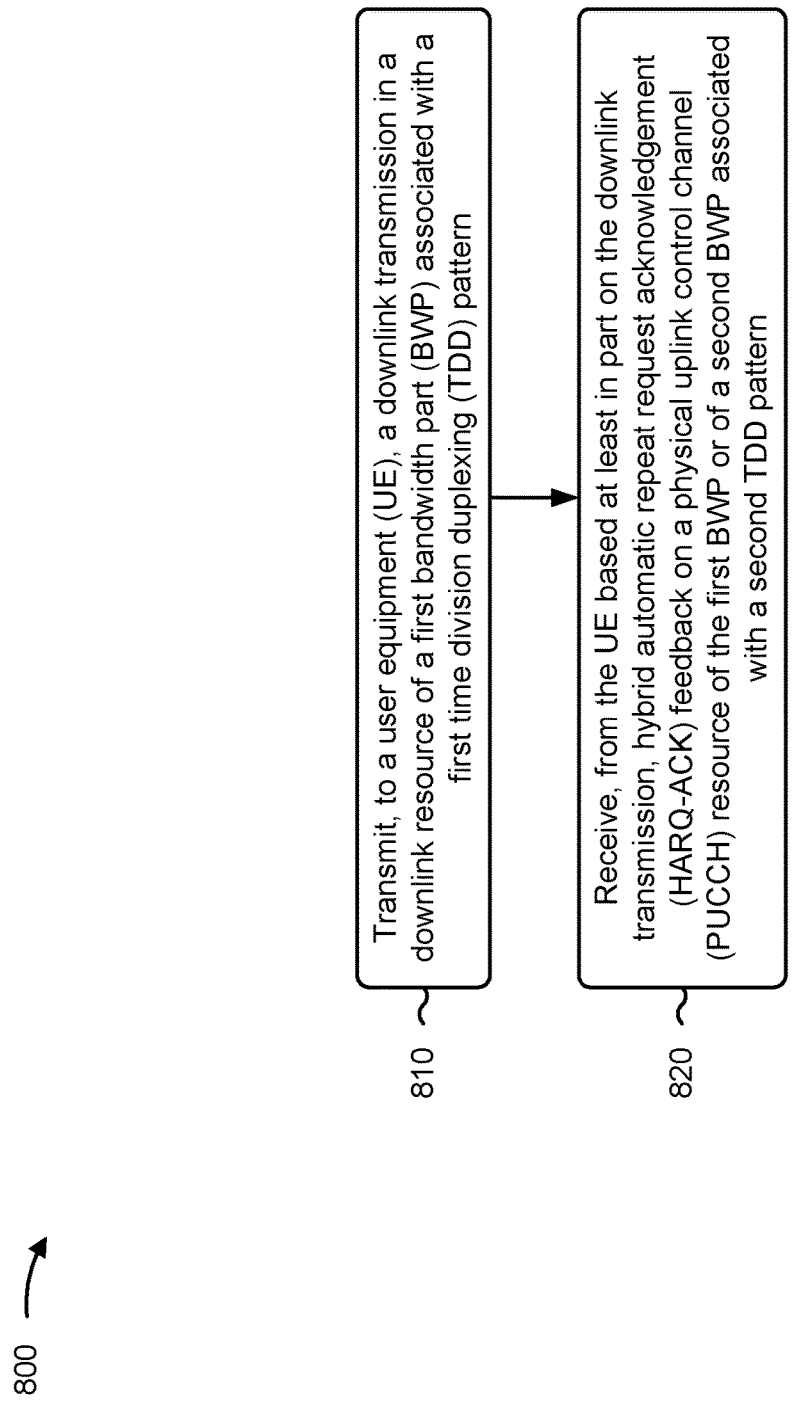

FIG. 8 is a diagram illustrating an example process 800 performed, for example, by a base station, in accordance with the present disclosure. Example process 800 is an example where the base station (e.g., base station 110) performs operations associated with feedback transmissions on uplink resources of BWPs.

As shown in FIG. 8, in some aspects, process 800 may include transmitting, to a UE, a downlink transmission in a downlink resource of a first BWP associated with a first TDD pattern (block 810). For example, the base station (e.g., using transmission component 1004, depicted in FIG. 10) may transmit, to a UE, a downlink transmission in a downlink resource of a first BWP associated with a first TDD pattern, as described above.

As further shown in FIG. 8, in some aspects, process 800 may include receiving, from the UE based at least in part on the downlink transmission, HARQ-ACK feedback on a PUCCH resource of the first BWP or of a second BWP associated with a second TDD pattern (block 820). For example, the base station (e.g., using reception component 1002, depicted in FIG. 10) may receive, from the UE based at least in part on the downlink transmission, HARQ-ACK feedback on a PUCCH resource of the first BWP or of a second BWP associated with a second TDD pattern, as described above.

Process 800 may include additional aspects, such as any single aspect or any combination of aspects described below and/or in connection with one or more other processes described elsewhere herein.

In a first aspect, process 800 includes transmitting, to the UE, DCI that indicates a PRI field associated with the PUCCH resource used for transmitting the HARQ-ACK feedback.

In a second aspect, alone or in combination with the first aspect, the PRI field includes one or more bits to indicate a BWP associated with the PUCCH resource, wherein the BWP is the first BWP or the second BWP, or the PRI field includes two bits to jointly indicate a PUCCH configuration associated with the PUCCH resource and a BWP associated with transmitting the HARQ-ACK feedback, wherein the BWP is the first BWP or the second BWP.

In a third aspect, alone or in combination with one or more of the first and second aspects, the PUCCH resource used for transmitting the HARQ-ACK feedback is associated with a PUCCH configuration of a BWP that combines the first BWP and the second BWP, based at least in part on a half-duplex slot formed by the first BWP and the second BWP, or the PUCCH resource used for transmitting the HARQ-ACK feedback is associated with a PUCCH configuration of either the first BWP or the second BWP that corresponds to an anchor BWP, based at least in part on a half-duplex slot formed by the first BWP and the second BWP.

In a fourth aspect, alone or in combination with one or more of the first through third aspects, process 800 includes receiving the HARQ-ACK feedback in accordance with a time offset in the PUCCH resource that is available in the first BWP or the second BWP, wherein the PUCCH resource is an earliest available PUCCH resource among the first BWP and the second BWP based at least in part on the first BWP and the second BWP not having an available PUCCH resource at the time offset.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
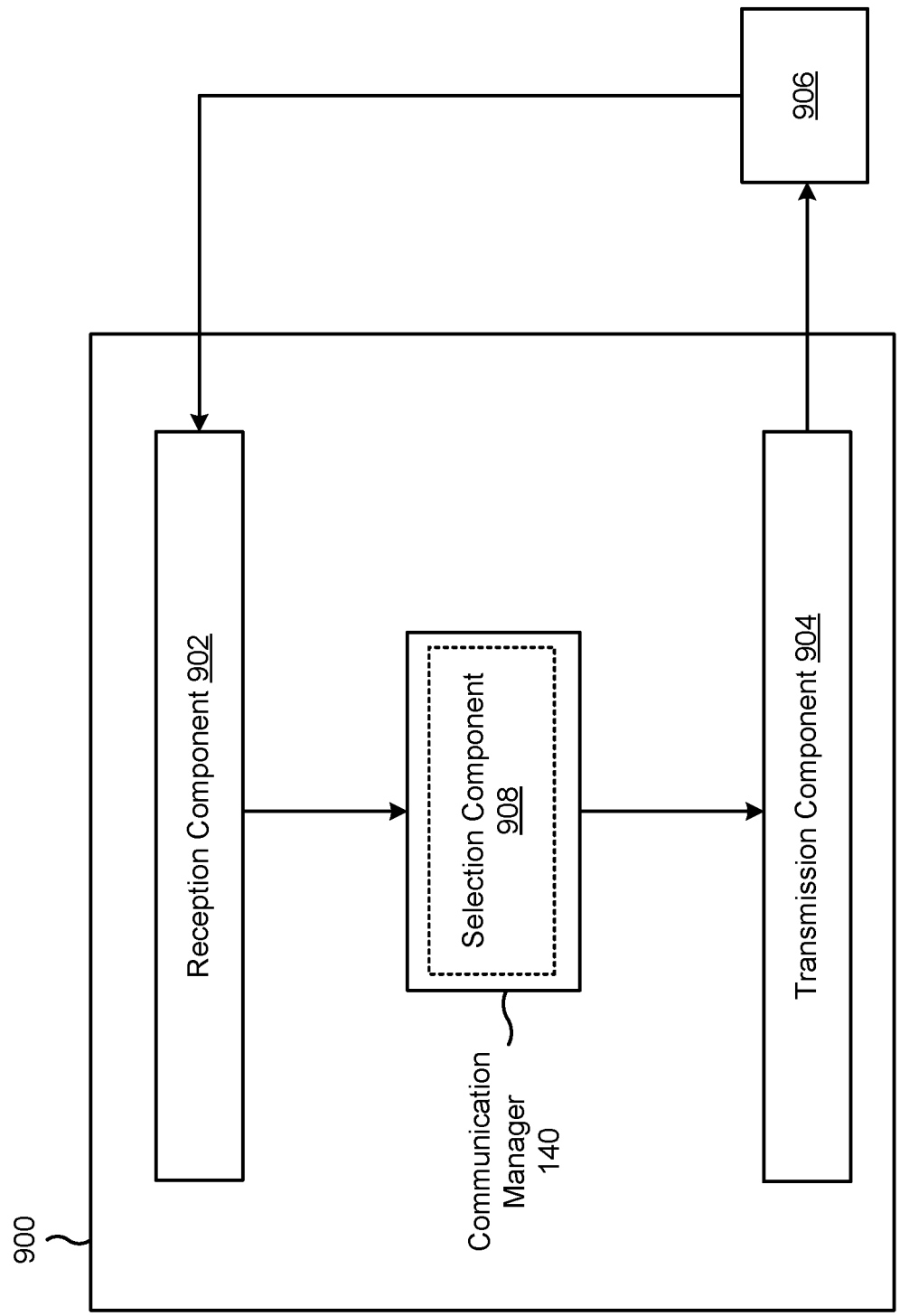
FIGS. 9-10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include a selection 908, among other examples.

In some aspects, the apparatus 900 may be configured to perform one or more operations described herein in connection with FIGS. 4-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive, from a base station, a downlink transmission in a downlink resource of a first BWP associated with a first TDD pattern. The transmission component 904 may transmit, to the base station based at least in part on the downlink transmission, HARQ-ACK feedback on a PUCCH resource of the first BWP or of a second BWP associated with a second TDD pattern.

The reception component 902 may receive, from the base station, DCI that indicates a PRI field associated with the PUCCH resource used for transmitting the HARQ-ACK feedback. The selection component 908 may select the first BWP or the second BWP for transmitting the HARQ-ACK feedback based at least in part on a self-interference condition, where an indication of the first BWP or the second BWP for transmitting the HARQ-ACK feedback is not received from the base station. The transmission component 904 may transmit the HARQ-ACK feedback in accordance with a time offset in the PUCCH resource that is available in the first BWP or the second BWP. The selection component 908 may select the first BWP or the second BWP based at least in part on both the first BWP and the second BWP having available PUCCH resources at the time offset.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
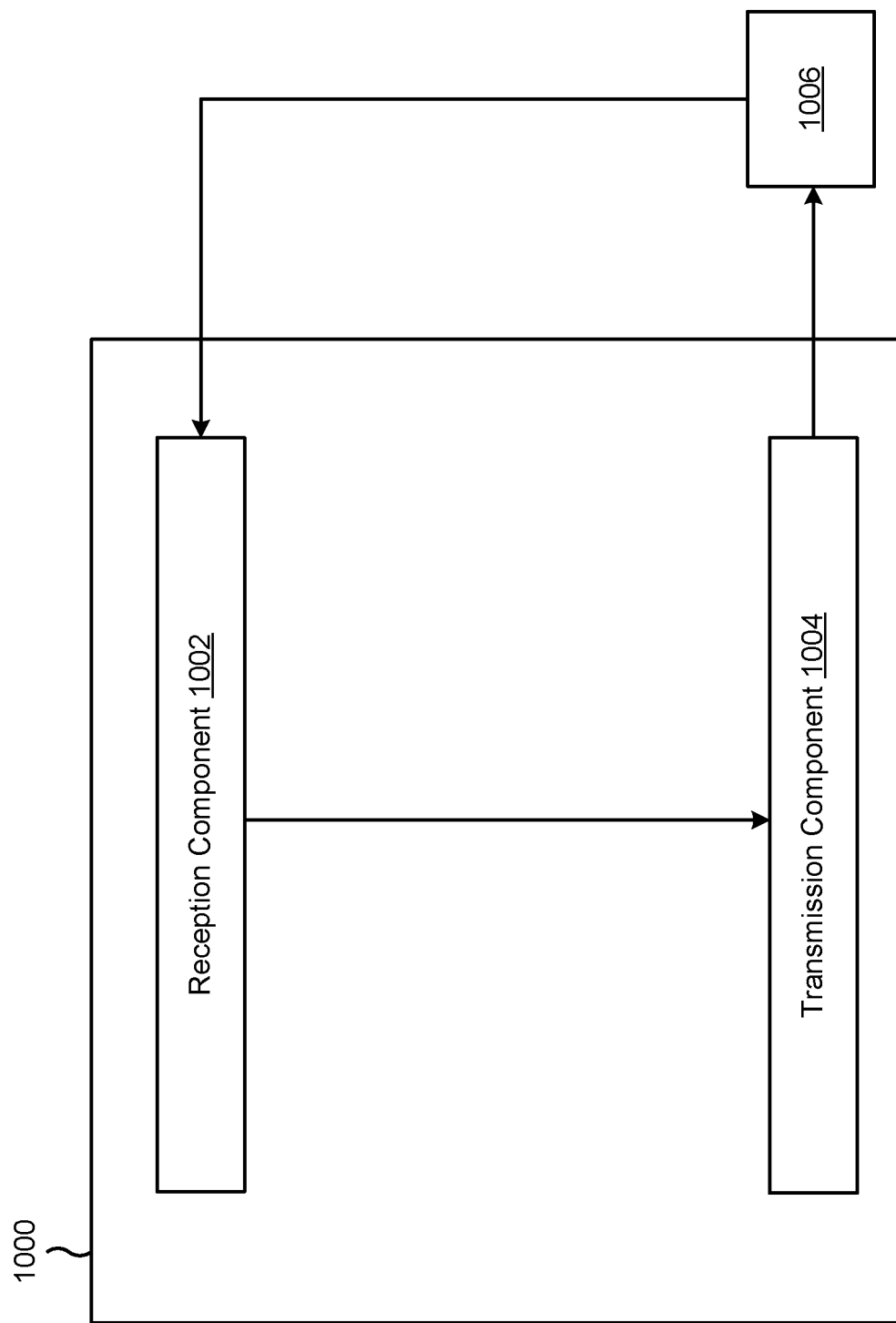

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004.

In some aspects, the apparatus 1000 may be configured to perform one or more operations described herein in connection with FIGS. 4-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The transmission component 1004 may transmit, to a UE, a downlink transmission in a downlink resource of a first BWP associated with a first TDD pattern. The reception component 1002 may receive, from the UE based at least in part on the downlink transmission, HARQ-ACK feedback on a PUCCH resource of the first BWP or of a second BWP associated with a second TDD pattern. The transmission component 1004 may transmit, to the UE, DCI that indicates a PRI field associated with the PUCCH resource used for transmitting the HARQ-ACK feedback.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from a base station, a downlink transmission in a downlink resource of a first bandwidth part (BWP) associated with a first time division duplexing (TDD) pattern; and transmitting, to the base station based at least in part on the downlink transmission, hybrid automatic repeat request acknowledgement (HARQ-ACK) feedback on a physical uplink control channel (PUCCH) resource of the first BWP or of a second BWP associated with a second TDD pattern.

Aspect 2: The method of Aspect 1, further comprising: receiving, from the base station, downlink control information that indicates a PUCCH resource indicator (PRI) field associated with the PUCCH resource used for transmitting the HARQ-ACK feedback.

Aspect 3: The method of Aspect 2, wherein the PRI field includes one or more bits to indicate a BWP associated with the PUCCH resource, wherein the BWP is the first BWP or the second BWP.

Aspect 4: The method of Aspect 2, wherein the PRI field includes two bits to jointly indicate a PUCCH configuration associated with the PUCCH resource and a BWP associated with transmitting the HARQ-ACK feedback, wherein the BWP is the first BWP or the second BWP.

Aspect 5: The method of any of Aspects 1 through 4, wherein the PUCCH resource used for transmitting the HARQ-ACK feedback is associated with a PUCCH configuration of a BWP that combines the first BWP and the second BWP, based at least in part on a half-duplex slot formed by the first BWP and the second BWP.

Aspect 6: The method of any of Aspects 1 through 5, wherein the PUCCH resource used for transmitting the HARQ-ACK feedback is associated with a PUCCH configuration of either the first BWP or the second BWP that corresponds to an anchor BWP, based at least in part on a half-duplex slot formed by the first BWP and the second BWP.

Aspect 7: The method of any of Aspects 1 through 6, further comprising: selecting the first BWP or the second BWP for transmitting the HARQ-ACK feedback based at least in part on a self-interference condition, wherein an indication of the first BWP or the second BWP for transmitting the HARQ-ACK feedback is not received from the base station.

Aspect 8: The method of any of Aspects 1 through 7, wherein transmitting the HARQ-ACK feedback comprises transmitting the HARQ-ACK feedback in accordance with a time offset in the PUCCH resource that is available in the first BWP or the second BWP.

Aspect 9: The method of Aspect 8, further comprising: selecting the first BWP or the second BWP based at least in part on both the first BWP and the second BWP having available PUCCH resources at the time offset.

Aspect 10: The method of Aspect 8, wherein the PUCCH resource is an earliest available PUCCH resource among the first BWP and the second BWP based at least in part on the first BWP and the second BWP not having an available PUCCH resource at the time offset.

Aspect 11: A method of wireless communication performed by a base station, comprising: transmitting, to a user equipment (UE), a downlink transmission in a downlink resource of a first bandwidth part (BWP) associated with a first time division duplexing (TDD) pattern; and receiving, from the UE based at least in part on the downlink transmission, hybrid automatic repeat request acknowledgement (HARQ-ACK) feedback on a physical uplink control channel (PUCCH) resource of the first BWP or of a second BWP associated with a second TDD pattern.

Aspect 12: The method of Aspect 11, further comprising: transmitting, to the UE, downlink control information that indicates a PUCCH resource indicator (PRI) field associated with the PUCCH resource used for transmitting the HARQ-ACK feedback.

Aspect 13: The method of Aspect 12, wherein: the PRI field includes one or more bits to indicate a BWP associated with the PUCCH resource, wherein the BWP is the first BWP or the second BWP; or the PRI field includes two bits to jointly indicate a PUCCH configuration associated with the PUCCH resource and a BWP associated with transmitting the HARQ-ACK feedback, wherein the BWP is the first BWP or the second BWP.

Aspect 14: The method of any of Aspects 11 through 13, wherein: the PUCCH resource used for transmitting the HARQ-ACK feedback is associated with a PUCCH configuration of a BWP that combines the first BWP and the second BWP, based at least in part on a half-duplex slot formed by the first BWP and the second BWP; or the PUCCH resource used for transmitting the HARQ-ACK feedback is associated with a PUCCH configuration of either the first BWP or the second BWP that corresponds to an anchor BWP, based at least in part on a half-duplex slot formed by the first BWP and the second BWP.

Aspect 15: The method of any of Aspects 11 through 14, wherein receiving the HARQ-ACK feedback comprises receiving the HARQ-ACK feedback in accordance with a time offset in the PUCCH resource that is available in the first BWP or the second BWP, wherein the PUCCH resource is an earliest available PUCCH resource among the first BWP and the second BWP based at least in part on the first BWP and the second BWP not having an available PUCCH resource at the time offset.

Aspect 16: An apparatus for wireless communication at a device, comprising a processor; memory coupled with the processor; and instructions stored in the memory and executable by the processor to cause the apparatus to perform the method of one or more of Aspects 1-10.

Aspect 17: A device for wireless communication, comprising a memory and one or more processors coupled to the memory, the one or more processors configured to perform the method of one or more of Aspects 1-10.

Aspect 18: An apparatus for wireless communication, comprising at least one means for performing the method of one or more of Aspects 1-10.

Aspect 19: A non-transitory computer-readable medium storing code for wireless communication, the code comprising instructions executable by a processor to perform the method of one or more of Aspects 1-10.

Aspect 20: A non-transitory computer-readable medium storing a set of instructions for wireless communication, the set of instructions comprising one or more instructions that, when executed by one or more processors of a device, cause the device to perform the method of one or more of Aspects 1-10.

Aspect 21: An apparatus for wireless communication at a device, comprising a processor; memory coupled with the processor; and instructions stored in the memory and executable by the processor to cause the apparatus to perform the method of one or more of Aspects 11-15.

Aspect 22: A device for wireless communication, comprising a memory and one or more processors coupled to the memory, the one or more processors configured to perform the method of one or more of Aspects 11-15.

Aspect 23: An apparatus for wireless communication, comprising at least one means for performing the method of one or more of Aspects 11-15.

Aspect 24: A non-transitory computer-readable medium storing code for wireless communication, the code comprising instructions executable by a processor to perform the method of one or more of Aspects 11-15.

Aspect 25: A non-transitory computer-readable medium storing a set of instructions for wireless communication, the set of instructions comprising one or more instructions that, when executed by one or more processors of a device, cause the device to perform the method of one or more of Aspects 11-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
one or more memories; and
one or more processors, coupled to the one or more memories, configured to:
receive, from a base station, a downlink transmission in a downlink resource of a first bandwidth part (BWP) associated with a first time division duplexing (TDD) pattern that enables a structure of a sub-band full duplex slot or an in-band full-duplex slot; and
transmit, to the base station based at least in part on the downlink transmission, hybrid automatic repeat request acknowledgement (HARQ-ACK) feedback on a physical uplink control channel (PUCCH) resource of the first BWP or a second BWP associated with a second TDD pattern, wherein the first BWP or the second BWP is selected based at least in part on a self-interference condition at the UE.

2. The apparatus of claim 1, wherein the one or more processors are further configured to:
receive, from the base station, downlink control information that indicates a PUCCH resource indicator (PRI) field associated with the PUCCH resource used for transmitting the HARQ-ACK feedback.

3. The apparatus of claim 2, wherein the PRI field includes one or more bits to indicate the first BWP or the second BWP.

4. The apparatus of claim 2, wherein the PRI field includes two bits to jointly indicate a PUCCH configuration associated with the PUCCH resource and the first BWP or the second BWP.

5. The apparatus of claim 1, wherein a third BWP combines the first BWP and the second BWP, based at least in part on a half-duplex slot formed by the first BWP and the second BWP.

6. The apparatus of claim 1, wherein the first BWP or the second BWP corresponds to an anchor BWP, based at least in part on a half-duplex slot formed by the first BWP and the second BWP.

7. The apparatus of claim 1, wherein the one or more processors are further configured to:
receive radio resource control signaling that configures the self-interference condition, wherein an indication of the first BWP or the second BWP for transmitting the HARQ-ACK feedback is not received from the base station.

8. The apparatus of claim 1, wherein the one or more processors, to transmit the HARQ-ACK feedback, are configured to transmit the HARQ-ACK feedback in accordance with a time offset in the PUCCH resource that is available in the first BWP or the second BWP.

9. The apparatus of claim 8, wherein the one or more processors are further configured to:
select the first BWP or the second BWP based at least in part on both the first BWP and the second BWP having available PUCCH resources at the time offset.

10. The apparatus of claim 8, wherein the PUCCH resource is an earliest available PUCCH resource among the first BWP and the second BWP based at least in part on the first BWP and the second BWP not having an available PUCCH resource at the time offset.

11. An apparatus for wireless communication at a base station, comprising:
one or more memories; and
one or more processors, coupled to the one or more memories, configured to:
transmit, to a user equipment (UE), a downlink transmission in a downlink resource of a first bandwidth part (BWP) associated with a first time division duplexing (TDD) pattern that enables a structure of a sub-band full duplex slot or an in-band full-duplex slot; and
receive, from the UE based at least in part on the downlink transmission, hybrid automatic repeat request acknowledgement (HARQ-ACK) feedback on a physical uplink control channel (PUCCH) resource of the first BWP or a second BWP associated with a second TDD pattern, wherein the first BWP or the second BWP is selected based at least in part on a self-interference condition at the UE.

12. The apparatus of claim 11, wherein the one or more processors are further configured to:
transmit, to the UE, downlink control information that indicates a PUCCH resource indicator (PRI) field associated with the PUCCH resource used for transmitting the HARQ-ACK feedback.

13. The apparatus of claim 12, wherein:
the PRI field includes one or more bits to indicate the first BWP or the second BWP; or
the PRI field includes two bits to jointly indicate a PUCCH configuration associated with the PUCCH resource and the first BWP or the second BWP.

14. The apparatus of claim 11, wherein:
a third BWP combines the first BWP and the second BWP, based at least in part on a half-duplex slot formed by the first BWP and the second BWP; or
the first BWP or the second BWP corresponds to an anchor BWP, based at least in part on a half-duplex slot formed by the first BWP and the second BWP.

15. The apparatus of claim 11, wherein the one or more processors, to receive the HARQ-ACK feedback, are configured to receive the HARQ-ACK feedback in accordance with a time offset in the PUCCH resource that is available in the first BWP or the second BWP, wherein the PUCCH resource is an earliest available PUCCH resource among the first BWP and the second BWP based at least in part on the first BWP and the second BWP not having an available PUCCH resource at the time offset.

16. A method of wireless communication performed by a user equipment (UE), comprising:
receiving, from a base station, a downlink transmission in a downlink resource of a first bandwidth part (BWP) associated with a first time division duplexing (TDD)

pattern that enables a structure of a sub-band full duplex slot or an in-band full-duplex slot; and transmitting, to the base station based at least in part on the downlink transmission, hybrid automatic repeat request acknowledgement (HARQ-ACK) feedback on a physical uplink control channel (PUCCH) resource of the first BWP or a second BWP associated with a second TDD pattern, wherein the first BWP or the second BWP is selected based at least in part on a self-interference condition at the UE.

17. The method of claim 16, further comprising:

receiving, from the base station, downlink control information that indicates a PUCCH resource indicator (PRI) field associated with the PUCCH resource used for transmitting the HARQ-ACK feedback.

18. The method of claim 17, wherein the PRI field includes one or more bits to indicate the first BWP or the second BWP.

19. The method of claim 17, wherein the PRI field includes two bits to jointly indicate a PUCCH configuration associated with the PUCCH resource and the first BWP or the second BWP.

20. The method of claim 16, wherein a third BWP combines the first BWP and the second BWP, based at least in part on a half-duplex slot formed by the first BWP and the second BWP.

21. The method of claim 16, wherein the first BWP or the second BWP corresponds to an anchor BWP, based at least in part on a half-duplex slot formed by the first BWP and the second BWP.

22. The method of claim 16, further comprising:

receiving radio resource control signaling that configures the self-interference condition, wherein an indication of the first BWP or the second BWP for transmitting the HARQ-ACK feedback is not received from the base station.

23. The method of claim 16, wherein transmitting the HARQ-ACK feedback comprises transmitting the HARQ-ACK feedback in accordance with a time offset in the PUCCH resource that is available in the first BWP or the second BWP.

24. The method of claim 23, further comprising:

selecting the first BWP or the second BWP based at least in part on both the first BWP and the second BWP having available PUCCH resources at the time offset.

25. The method of claim 23, wherein the PUCCH resource is an earliest available PUCCH resource among the first BWP and the second BWP based at least in part on the first BWP and the second BWP not having an available PUCCH resource at the time offset.

26. A method of wireless communication performed by a base station, comprising:

transmitting, to a user equipment (UE), a downlink transmission in a downlink resource of a first bandwidth part (BWP) associated with a first time division duplexing (TDD) pattern that enables a structure of a sub-band full duplex slot or an in-band full-duplex slot; and receiving, from the UE based at least in part on the downlink transmission, hybrid automatic repeat request acknowledgement (HARQ-ACK) feedback on a physical uplink control channel (PUCCH) resource of the first BWP or a second BWP associated with a second TDD pattern, wherein the first BWP or the second BWP is selected based at least in part on a self-interference condition at the UE.

27. The method of claim 26, further comprising:

transmitting, to the UE, downlink control information that indicates a PUCCH resource indicator (PRI) field associated with the PUCCH resource used for transmitting the HARQ-ACK feedback.

28. The method of claim 27, wherein:

the PRI field includes one or more bits to indicate the first BWP or the second BWP; or the PRI field includes two bits to jointly indicate a PUCCH configuration associated with the PUCCH resource and the first BWP or the second BWP.

29. The method of claim 26, wherein:

a third BWP combines the first BWP and the second BWP, based at least in part on a half-duplex slot formed by the first BWP and the second BWP; or the first BWP or the second BWP corresponds to an anchor BWP, based at least in part on a half-duplex slot formed by the first BWP and the second BWP.

30. The method of claim 26, wherein receiving the HARQ-ACK feedback comprises receiving the HARQ-ACK feedback in accordance with a time offset in the PUCCH resource that is available in the first BWP or the second BWP, wherein the PUCCH resource is an earliest available PUCCH resource among the first BWP and the second BWP based at least in part on the first BWP and the second BWP not having an available PUCCH resource at the time offset.

* * * * *